(12) United States Patent
Hung

(10) Patent No.: US 11,782,824 B2
(45) Date of Patent: Oct. 10, 2023

(54) UNIVERSAL DATA PATH ARCHITECTURE FOR DIFFERENT DATA ARRAY

(71) Applicant: MACRONIX INTERNATIONAL CO., LTD., Hsinchu (TW)

(72) Inventor: Shuo-Nan Hung, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 18 days.

(21) Appl. No.: 17/667,384

(22) Filed: Feb. 8, 2022

(65) Prior Publication Data

US 2023/0251964 A1    Aug. 10, 2023

(51) Int. Cl.
| G06F 12/00 | (2006.01) |
| G06F 12/02 | (2006.01) |
| G06F 12/0882 | (2016.01) |
| G06F 12/1045 | (2016.01) |
| G06F 13/16 | (2006.01) |

(52) U.S. Cl.
CPC ...... *G06F 12/0238* (2013.01); *G06F 12/0882* (2013.01); *G06F 12/1045* (2013.01); *G06F 13/1673* (2013.01)

(58) Field of Classification Search
CPC ............. G06F 12/0238; G06F 12/0882; G06F 12/1045; G06F 13/1673
See application file for complete search history.

(56) References Cited

U.S. PATENT DOCUMENTS

| 5,911,152 | A | 6/1999 | Wooten |
| 6,373,751 | B1 | 4/2002 | Bondurant |
| 9,838,500 | B1 * | 12/2017 | Ilan ..................... G06F 12/0875 |
| 10,319,416 | B2 | 6/2019 | Oh et al. |
| 10,678,476 | B2 | 6/2020 | Lee |
| 2019/0146712 | A1 * | 5/2019 | Lee ....................... G06F 3/0679 |
| | | | 711/103 |
| 2020/0125443 | A1 | 4/2020 | Hung et al. |
| 2021/0279172 | A1 * | 9/2021 | Hung .................. G06F 12/0882 |
| 2022/0004472 | A9 | 1/2022 | Ware et al. |

FOREIGN PATENT DOCUMENTS

WO    0196987 A2    12/2001

* cited by examiner

*Primary Examiner* — Arvind Talukdar
(74) *Attorney, Agent, or Firm* — Andrew L. Dunlap; Haynes Beffel & Wolfeld LLP

(57) ABSTRACT

A data path for memory addressable using an addressing scheme based on a minimum addressable unit, such as a byte, having a size (e.g. 8) which is a power of 2, is configured for transferring data between the memory array and a data interface using a transfer storage unit having N bits (e.g. 12), where N is an integer that is not a power of 2. A page buffer and cache in the data path can be configured in unit arrays with N rows, and to transfer data in the transfer storage units from selected N cell columns.

20 Claims, 6 Drawing Sheets

UNIVERSAL DATA PATH ARCHITECTURE FOR DIFFERENT DATA ARRAY

BACKGROUND

Field

Technology is described in the field of integrated circuit memory, and more particularly configurations of memory having a cache disposed in a data path between the memory and an interface.

Description of Related Art

Some types of high density memory including, for example, NAND flash memory, are configured for page mode operations, which involve parallel movement of a relatively large page of data from the memory array to a page buffer in parallel, while an input/output interface can include a much smaller number of pins. For context, a page can comprise on the order of 16 kilobytes (KB) or more, in some cases, while the input/output interface may include 8 pins for data transfer. To facilitate higher throughput, and other operations, a cache memory can be disposed between the page buffer and the input/output interface. Using a cache memory, a page of data can be transferred quickly from the page buffer to the cache. The input/output interface can operate using access to the cache, during the interval of time that a next page is transferred between the page buffer and the memory array.

In the implementation of devices including a page buffer and a cache for page operations, layout on an integrated circuit can be a factor. It is desirable for the page buffer and the cache to fit within the pitch of the plurality of data lines providing connection to a page of data in the memory array. The page buffer cells and cache cells can include clocked storage elements like latches or flip-flops, formed using a number of transistors and, as a result, can require a layout pitch much larger than the pitch of the data lines. In one approach to this layout issue, the page buffer and cache are arranged in a plurality of rows and columns, where each column fits within the orthogonal pitch of a number of data lines equal to the number of rows. For example, in a layout with 16 rows, the column is connected to 16 data lines, stores 16 bits, and fits within the orthogonal pitch of the 16 data lines.

The number of rows, and the number of cells per column, in the cache is typically a power of 2, such as 8 or 16, to facilitate data transfers of integer multiples of the size of the minimum addressable storage unit. A base 2 number used as an address will identify the boundary of a minimum addressable unit with a number that is an integer multiple of the size of the minimum addressable unit. The minimum addressable storage unit has a size corresponding to the minimum addressable size supported by the memory. The size of the minimum addressable unit is typically one byte, or 8 bits. In some devices, the size of the minimum addressable unit can be a word, or 16 bits. If the minimum addressable size is 8 bits, it will be represented in binary by 1000. Thus, the boundary of a byte (8 bits) in a base 2 address will always have the three least significant bits equal to zero (i.e. XXXXXX000). If the minimum addressable size is 16 bits, it will be represented in binary by 10000. Thus, the boundary of a word (16 bits) in a base 2 address will always have the four least significant bits equal to zero (i.e. XXXXX0000). Other sizes of minimum addressable units are possible as well. The number of rows in a cache can be an integer multiple of the size of the minimum addressable unit, which results in a design constraint on the layout of the page buffer and cache.

However, the vertical pitch of the page buffer and cache can be significant. It is desirable to provide, therefore, a configuration that can reduce the area needed for implementation of a page buffer and cache in integrated circuit devices having memory.

SUMMARY

A technology is described providing a data path for memory addressable using an addressing scheme based on a minimum addressable unit, such as a byte, having a size (e.g. 8 or 16) which is a power of 2. The data path is configured for transferring data between the memory array and a data interface using a transfer storage unit having N bits (e.g. 12), where N is an integer that is a non-integer multiple (e.g., 1.5 times 8, or 0.75 times 16) of the size of the minimum addressable unit. In embodiments described, N is not a power of 2. The data path configured this way can be supported by an efficiently implemented page buffer and cache.

The data path can include, for example, a page buffer configured for connection to the memory array, and the cache configured for connection to the page buffer and to the data interface. The memory array can include a plurality of data lines for connection to the page buffer arranged in a number X groups of data lines. The cache can include one group of cache unit arrays for each group of the X groups of data lines. Each cache unit array can be configured for access to an integer number P bits in the page buffer, and can include a number P cache cells arranged in N cache rows and P/N cache columns.

The data path can include circuits coupled to the cache for connecting N cache cells in a selected one of the P/N cache columns of a selected cache unit array in each of the X groups of cache unit arrays, to a set of M interface lines, where M is N times X. The data interface in turn is coupled to the M interface lines, include circuits for data transfers in D bit units in each interface clock cycle, where D is an integer multiple of the size of the minimum addressable unit addressable (e.g., 8 or 16) using the binary addressing scheme.

In a configuration of this data path, M is a common multiple of D and N. For example, for a minimum addressable unit of one byte (eight bits), D can be 8 for an eight pin, single data rate port, 16 for an eight pin, double data rate port, 16 for a 16 pin, single data rate port, and so on.

The memory can include address translation circuits that are responsive to an input address to generate select signals for controlling the data path circuits in the transfer of the N bit transfer storage units.

Using a data path as described herein, the page of data according to the addressing scheme can include a plurality of minimum addressable units (e.g., bytes) with sequential addresses. A page of data stored in the memory array is scattered in transfer storage units of N bits, corresponding to the size of the N bit columns in the cache and page buffer, among memory cells that are coupled to data lines disposed non-sequentially across the X groups. Sequential transfer storage units are interleaved among different cache unit arrays in the X groups.

A memory is described which comprises a memory array having a plurality of data lines for access to memory cells in the memory array. The plurality of data lines includes a number X groups of data lines, where X is an integer greater than 1. The memory includes a data path including a page buffer and a cache. The page buffer is configured for access to the plurality of data lines. The page buffer includes a page buffer cell for each data line in the plurality of data lines, and can be configured in a plurality of groups of page buffer unit arrays. The cache is coupled to the page buffer. The cache includes one group of cache unit arrays for each group of the X groups of data lines. Each cache unit array is configured for access to an integer number P buffer cells in the page buffer, and includes the number P of cache cells arranged in N cache rows and P/N cache columns. N is not a power of two, and is a non-integer multiple of the size of the minimum addressable unit. Data path circuits are coupled to the cache for connecting N cache cells in a selected one of the P/N cache columns in a selected cache unit array in each of the X groups of cache unit arrays to M interface lines, where M is N times X. An interface is coupled to the M interface lines, and includes circuits for data transfers in D bit units, where D is an integer multiple of the size of the minimum addressable unit, and M is a common multiple of D and N. Address translation circuits are provided, responsive to an input address identifying a minimum addressable unit to generate select signals for the data path circuits.

The address translation circuits can include an address divider, to divide the input address by a factor F equal to the number M divided by the size of the minimum addressable unit. The address divider outputs a quotient used for selecting a cache column, and a cache unit array in each of the X groups of cache unit arrays. The address divider outputs a remainder used by the interface for selecting the D bit units from the M interface lines for transfer on the interface.

The address translation circuits can be configured to generate a sequence of select signals for moving the transfer storage units via the data path circuits and the interface, to support transfer of a page of data in a plurality of D bit units of data having sequential addresses on the interface.

A configuration of a page buffer and cache for the data path is described, in which the page buffer and the cache are composed of a plurality of unit arrays which are aligned with corresponding sets of data lines in the memory array. Each unit array can comprise a number N rows and a number Y columns. The set of data lines coupled to a page buffer unit array includes N of data lines connected to N cells in each of the Y columns of the page buffer unit array. A set of data lines connecting the page buffer to the memory array has an orthogonal pitch (center to center spacing of adjacent parallel bit lines) which is a function of the memory technology and manufacturing node, and can be quite small for high density memory. To fit within the available space, the number N cells in the page buffer and in the cache must fit within the orthogonal pitch of N bit lines. This is accomplished by the stacking of the cells in the page buffer and in the cache into N rows and Y columns. Thus, the orthogonal pitch of the storage elements in the page buffer and the cache for one column of the unit arrays must be equal to or less than the pitch of the set of N data lines to which the unit array column is connected.

Using a number N which is smaller than D enables implementation of a cache and page buffer having a smaller area that would be used for a cache and page buffer having D rows.

Technologies described support efficient layout and operation high density memory, using "non-binary" cache configurations. A data path configuration implemented as described herein can overcome a problem with access patterns for one word of data stored in two different columns of the cache. Also, a data path configuration implemented as described herein can overcome a problem with the arrangement of the interconnections for cache support and selection for selecting the same bit in different words located in different rows of the cache and page buffer. Furthermore, a data path configuration implemented as described herein provides a solution to the problem of how to arrange the layout of the unit arrays supporting the memory array, particularly for very large page sizes.

Other aspects and advantages of the present invention can be seen on review of the drawings, the detailed description and the claims, which follow.

DETAILED DESCRIPTION

A detailed description of embodiments of the present technology is provided with reference to the FIGS. 1-6.

Figure 1:
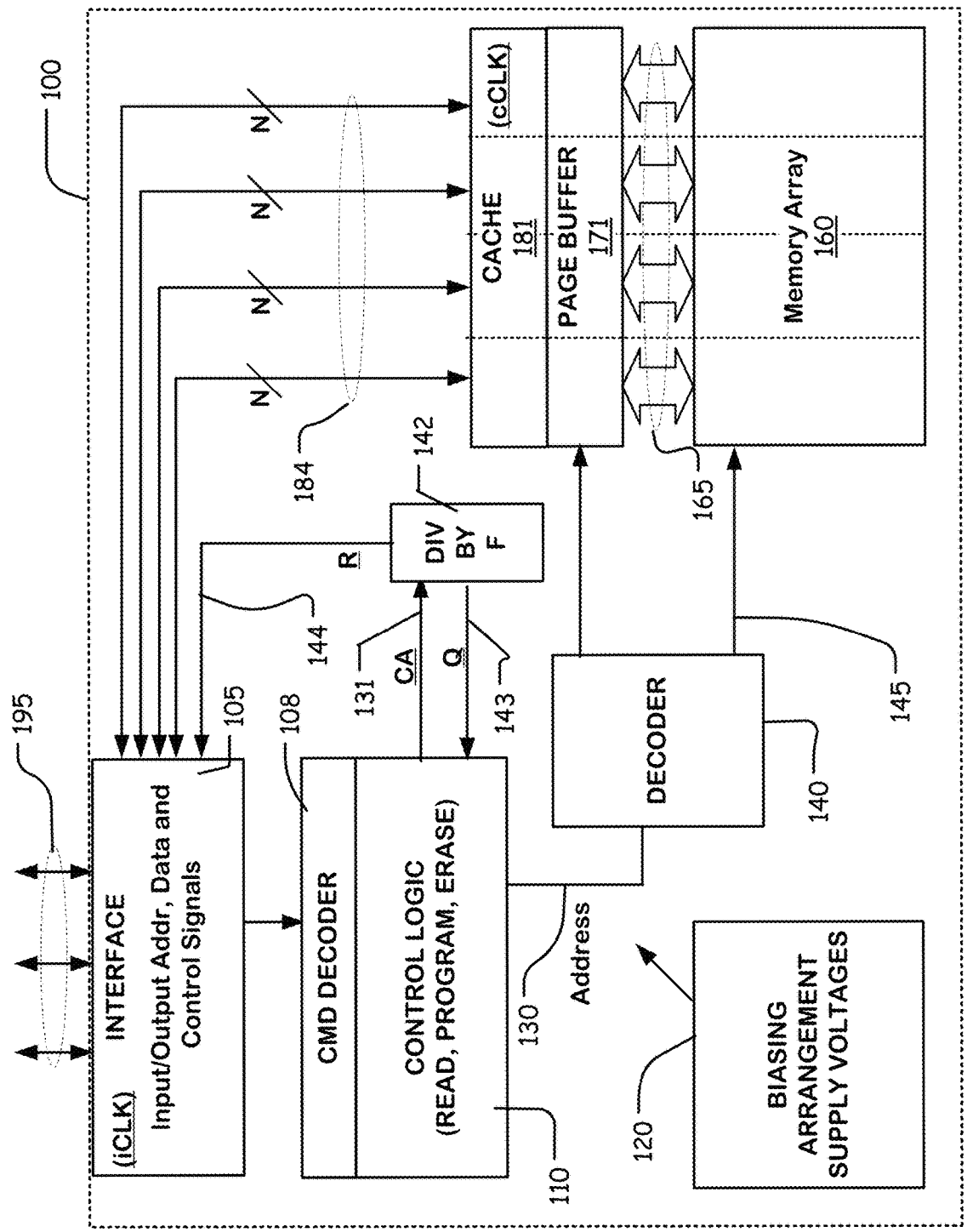
FIG. 1 is a block diagram of an integrated circuit including a memory array and a non-binary cache configuration as described herein.

FIG. 1 is a simplified chip block diagram of an integrated circuit device having a memory array 160, with a page buffer 171 and a second level buffer, referred to herein as a cache 181, on a single integrated circuit substrate. Memory devices as described herein can be implemented using multichip modules, stacked chips and other configurations as well.

The memory array 160 in a device like that of FIG. 1 can comprise a NAND flash array, using dielectric charge trapping or floating gate charge trapping memory cells. Also, the memory array 160 can comprise other non-volatile memory types, including NOR flash, ferroelectric RAM, phase change memory, transition metal oxide programmable resistance memory, and so on. Also, the memory array 160 can comprise volatile memory, such as DRAM and SRAM.

Control logic 110 with a command decoder 108, on the integrated circuit 100 includes logic circuits, such as a state machine and address counter, responsive to received commands and addresses to execute memory operations for access to the memory array 160 via the cache 181 and page buffer 171, including read and write operations. For a NAND flash, the write operations can include program and erase operations. In some embodiments, random page read operations can be executed by which data having an address identifying a byte within a page, and not on a page boundary, can be read, as pages of data are moved from the memory array 160.

The control logic 110 outputs control signals (not shown) to components of the memory device, and addresses on bus 130. The addresses supplied on bus 130 can include for example outputs of an address counter (e.g., sequential addresses) in the control logic 110, or addresses carried in received commands.

An address decoder 140 includes a row decoder coupled to a plurality of word lines 145, and arranged along rows in the memory array 160, and a column decoder coupled to the page buffer 171 and cache 181. Also, in this example configuration an address divider 142 is coupled by line to the control logic 110 to receive a column address CA on line 131, which includes a column address portion of the address. The page buffer 171 is coupled to a plurality of groups of data lines 165 arranged along columns in the memory array 160 for reading data from and writing data to corresponding groups of memory cells in the memory array 160. In FIG. 1, four groups of data lines 165 are illustrated, which are coupled to respective groups of memory cells in the memory array 160. The number of groups is a function of the configuration of the data path as described in more detail below. The groups of data lines are physically grouped in a layout on the integrated circuit for connection to columns of page buffer cells in the page buffer 171. The plurality of groups of data lines have in combination a number of data lines usable in parallel, which can be equal to the width of a page plus the extra data. For instance, a page can include 16K bits+2K extra bits. Each group of data lines can include one fourth of the number of data lines for the page.

The memory array can include bit lines and word lines. Data lines, as the term is used herein, are data paths connecting the bit lines to the page buffer 171. In some configurations, there is one data line per bit line. In some configurations, two bit lines may be selectively connected to, and share, one data line.

The page buffer 171 can include one or more storage element, used as a page buffer cell, for each data line. The address decoder 140 can select and couple specific memory cells in the memory array 160 via respective data lines to the page buffer 171. In FIG. 1, the memory array 160 includes four groups of memory cells. In a page operation, the data lines 165 are configured in four groups of data lines, for the corresponding four groups of memory cells in the array, and can be used in parallel to transfer a page to the page buffer 171. The page buffer 171 can store data that is written to or read from these specific memory cells in parallel. The page buffer 171 can have a page width for pages including thousands of bytes, such as 16 KB or 32 KB, or more with extra bits, such as 2 KB, usable for metadata about the page such as associated ECC codes.

Cache 181 is coupled to the page buffer, and can include at least one storage element, used as a cache cell, for each data line. A page of data can be transferred from the page buffer 171 to the cache 181 in a short time compared to the time required to transfer a page of data from the memory cells in the array to the page buffer 171.

The page buffer cells in page buffer 171 and the cache cells in cache 181 can comprise clocked storage elements such as flip-flops and latches using a multiple row by multiple column architecture. The cache 181 can operate in response to a cache clock (cCLK).

Other embodiments can include three-level buffer structures including the page buffer 171 and two additional buffer levels. Also, other arrangements of buffer memory structures in the data path circuits between the page buffer and the interface can be used.

A data interface, such as I/O interface 105 is connected to the page buffer 171 and cache 181 by data bus 184 which comprises M interface lines. The data bus 184 can have a bus width less than a page, including substantially less than a page. In examples described below, the interface lines in the data bus 184 can include the number N interface lines per group in the memory array 160, where N is a non-integer multiple of the minimum addressable unit for the memory array 160 selected according to the configuration of the data path as described below.

The I/O interface 105 can include a buffer configured to latch data from the sets of bus lines from all the groups in parallel, latching N times the number of groups (e.g. N×4) of bits in each cache clock cycle.

Input/output data, addresses and control signals are moved among the data interface, the command decoder 108 and the control logic 110, and input/output (I/O) ports 195 on the integrated circuit memory device 100 or other data sources internal or external to the integrated circuit memory device 100.

In the example shown in FIG. 1, control logic 110 using a bias arrangement state machine controls the application of bias arrangement supply voltage generated or provided through the voltage supply or supplies in block 120, such as read, program and erase voltages including page read to transfer data from a page in the memory array to the page buffer.

The control logic 110 and command decoder 108 constitute a controller which can be implemented using special purpose logic circuitry including state machines and supporting logic. In alternative embodiments, the control logic comprises a general-purpose processor, which can be implemented on the same integrated circuit, which executes a computer program to control the operations of the device. In yet other embodiments, a combination of special-purpose logic circuitry and a general purpose processor can be utilized for implementation of the control logic.

The I/O interface 105, or other type of data interface, and array addresses on bus 130 can be configured to operate using "binary" addressing, such that each unit of storage in the memory array and each unit of storage transferred on the I/O interface 105 is addressed by addresses having boundaries defined by a power of 2, including 8, 16, 32 and so on, corresponding to specific orders of a binary number used as the address. In a technology described herein, the page buffer 171 and the cache 181 are configured with transfer storage units that are "non-binary", such that some of the units of storage in the cache and page buffer have boundaries that are not defined by a power of 2. For example, embodiments described herein include a page buffer and cache in which transfer storage units (one transfer storage unit in each cache column in examples below) have a number N of bits which is a non-integer multiple of the size of the minimum addressable storage unit. In one example, for a minimum addressable storage unit of one byte, the cache column is 12 bits, or 1.5 times the size of the minimum addressable storage unit, and the I/O interface 105 is configured for external transfer of an integer multiple of the size of the minimum addressable storage unit per cycle of the interface clock iCLK. For a minimum addressable storage unit of one byte, the interface can be configured to transfer 8 bits per clock cycle, or 16 bits per clock cycle as discussed above.

As illustrated in FIG. 1, an address divider 142 ("divide by F") receives address bits from line 131 which specify a column address CA identifying the first bit at the boundary of the minimum addressable unit to be accessed. The address divider 142 divides the column address CA by a factor F equal to the number M (column size N times the number X of groups) divided by the size of the minimum addressable unit. (The number X of N-bit cache transfer units include F minimum addressable units). A division by F produces both a quotient and a remainder, for at least some column addresses. The address divider 142 provides a quotient Q on line 143 applied to the control logic 110 for use in address generation supporting the "non-binary" addressing in the cache and page buffer. The address divider 142 provides a remainder R on line 144 which is applied to the I/O interface 105 for use in address generation supporting the "binary" addressing in the I/O interface 105. In one approach, external address bits for the column address CA are translated to the internal addressing quotient Q and remainder R through the address divider 142. The quotient Q is sent to a Y-address counter in the controller for a starting counter address and the remainder R is sent to interface 105 for a starting address, and incremented to address the data required in response to the memory operation. The counter address is then sent to Y decoder in the address decoder 140 to select the column in the unit array inside the cache array, and incremented to address the data required in response to the memory operation.

The I/O interface 105 can include a buffer, a shift register buffer or other supporting circuits along with a transceiver for transmitting and receiving data on ports using an interface clock (iCLK). For example, the integrated circuit memory device 100 can include input/output ports using 8 or 16 pins for receiving and transmitting bus signals. Another pin can be connected to a clock line carrying clock signal iCLK. Yet another pin can be connected to a control line carrying chip-enable or chip-select signal CS #. In some embodiments, the I/O ports 195 can connect to on-chip host circuits, such as a general purpose processor or special purpose application circuitry, or a combination of modules providing system-on-a-chip functionality supported by the memory array 160.

The interface clock iCLK can be supplied by one of the I/O ports 195, or internally generated. The cache clock cCLK can be generated in response to the interface clock iCLK, or separately generated, and can have a different clock rate. Data can be transferred between the I/O interface 105 and the cache using the cache clock cCLK, and can be transferred through the I/O ports 195 of the I/O interface 105 using the interface clock iCLK.

In one embodiment, the I/O interface 105 is a byte wide interface including a set of eight I/O ports 195 used for transferring data, and configured to operate in a double data rate mode in which two bytes are output in one byte at a time, on rising and falling edges of one interface clock cycle. In other embodiments, the I/O interface 105 is a byte wide interface including a set of eight I/O ports 195 which are operable in a double data rate mode (two bytes per clock cycle) or a single data rate mode (one byte per clock cycle) depending on a configuration setting on the device or carried by a command applied to the interface.

Other types of data interfaces, including parallel interfaces and serial interfaces can be used as well. A serial interface can be based on or compliant with a Serial Peripheral Interface (SPI) bus specification in which the command channel shares the I/O pins used by address and data. The I/O ports 195 on a particular integrated circuit memory device 100 can be configured to provide output data with an I/O data width that is an integer multiple of the size of the minimum addressable storage unit, which can be, for a minimum addressable unit of one byte, 8, 16, 32 or more bits in parallel per interface clock cycle.

The data interface in some implementations can be connected using a bus or other type of interconnection to a binary addressable memory, such as an SRAM or DRAM, on the same chip, or same multichip module.

The page buffer 171 and the cache 181 memory array are composed of a plurality of unit arrays which are aligned with corresponding sets of data lines in the memory array 160. Each unit array can comprise a number N rows and a number Y columns. The set of data lines includes N of data lines connected to N cells in each of the Y columns of the page buffer. A set of data lines connecting the page buffer to the memory array has an orthogonal pitch (center to center spacing of adjacent parallel bit lines) which is a function of the memory technology and manufacturing node, and can be quite small for high density memory. To fit within the available space, the number N cells in the page buffer and in the cache must fit within the orthogonal pitch of N bit lines. This is accomplished by the stacking of the cells in the page buffer and in the cache into columns. Thus, the orthogonal pitch of the storage elements in the page buffer 171 and cache 181 for one column of the unit array must be equal to or less than the pitch of the set of N bit lines to which the column in the unit array is conducted.

Figure 2:
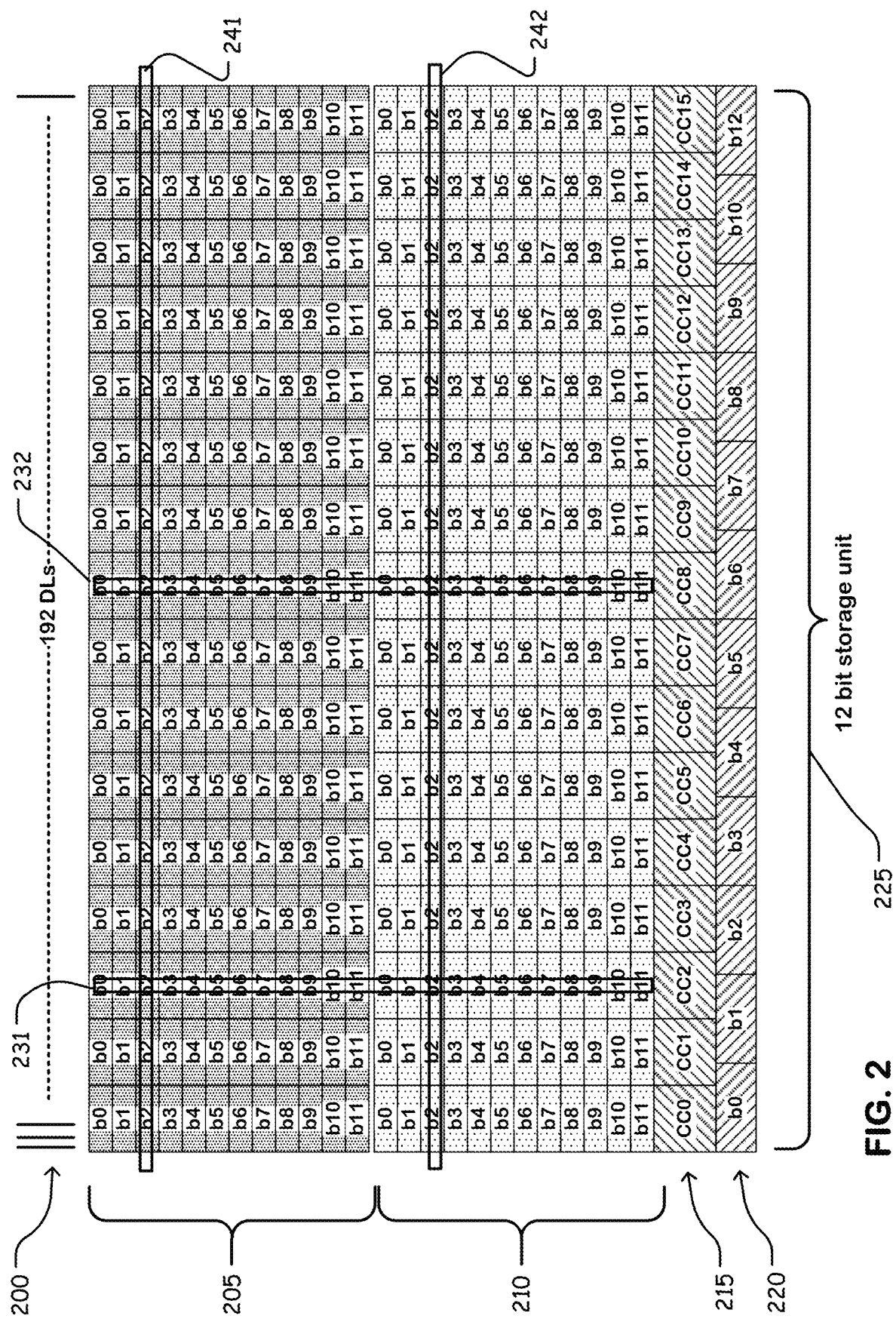
FIG. 2 illustrates layout of a non-binary cache unit array and page buffer unit array, with interconnections for data transfer functions between the cache unit array and page buffer unit array.

FIG. 2 illustrates a layout of a page buffer unit array 205 and cache unit array 210 according to an example configuration of the technology described herein. In this example, it is assumed that the minimum addressable unit is one byte, and the interface is operable to output a maximum of two bytes per interface clock cycle in a double data rate mode.

In this example, the page buffer unit array 205 has N=12 rows by Y=16 columns of cells coupled to 192 data lines 200, where the cells in each column are labeled b0 to b11. The number N is a non-integer multiple of 8. Thus, each column of the page buffer unit array 205 is laid out with and fits within the orthogonal pitch of 12 data lines. Likewise, the cache unit array 210 has 12 rows by 16 columns of cells, where again the cells in each column are labeled b0 to b11. The unit array of FIG. 2 includes a row 215 of Y=16 cache select and control circuits labeled by cache column numbers CC0 to CC15 corresponding to each of the 16 cache columns. Also, the unit array includes a row 220 of N=12 cache drivers, one for each bit b0 to b11 of a selected column in the cache unit array 210, providing a data path for a transfer storage unit 225 of N=12 bits.

Laying out the unit array with a number N of rows, where N is a non-integer multiple of the size of the minimum addressable unit, such as 12 rows for a byte based addressing system, instead of an integer multiple of the binary number of rows such as sixteen rows, can save area on the integrated circuit. The savings in the number of rows (16−12=4) translates to a saving in area equal to the width of the unit array times the vertical pitch of the eliminated rows (4 eliminated rows in this example). In this example of a reduction from 16 to 12 rows, a reduction of 25% of the area of the page buffer and cache is achieved. The flexibility provided by an implementation in which N is a non-integer multiple of the size of the minimum addressable storage unit allows for more compact layouts.

Thus, in this technology, the cache unit array outputs a transfer storage unit of N bits, where N is a non-integer multiple of the size of the minimum addressable unit. As a result, the selection of the column of the unit array having a transfer unit of N bits, such as 12, is a non-binary addressing operation. Also, according to this layout, a word of two bytes addressed from the memory array, stored in the cache having 12 rows as illustrated in FIG. 2, cannot be stored in a single column of a unit array. As described in more detail below, each group of the cache is configured to transfer one cache column of data (a cache transfer unit of 12 bits) per cycle of the cache clock cCLK. For the example using four groups, the configuration results in transfer of one cache column per group, or 4 cache columns and 48 bits in a single cache clock cycle. This 48 bits consists of three 16 bit words for transfer between the cache and the interface. The data of these three 16 bits words however is distributed by this scatter/gather data path configuration in four 12 bit parts to memory cells in the four different groups of the memory array.

As illustrated in FIG. 2, an array of interconnections is formed in patterned conductor layers (e.g. metal layers) overlying the page buffer unit array 205 and the cache unit array 210. The interconnections are used to transfer data from the page buffer unit array 205 to the cache unit array 210 in parallel operations. Representative interconnections are illustrated including vertical interconnection 231 over cache column number CC2, vertical interconnection 232 over cache column number CC8, horizontal interconnection 241 over page buffer row b2, and horizontal connection 242 over cache row b2. In an operation to transfer data between the page buffer unit array 205 and the cache unit array 210, horizontal interconnections 241 and 242 are energized by control signals for transfer of the data in the cells in the selected rows via the vertical interconnections between the page buffer and cache for a read operation, and between the cache in the page buffer for a write operation. This operation can be executed 12 times (one for each row) to transfer the entire contents of the page buffer unit array 205 to the cache unit array 210, or vice versa from the cache unit array 210 to the page buffer unit array 205.

Figure 3:
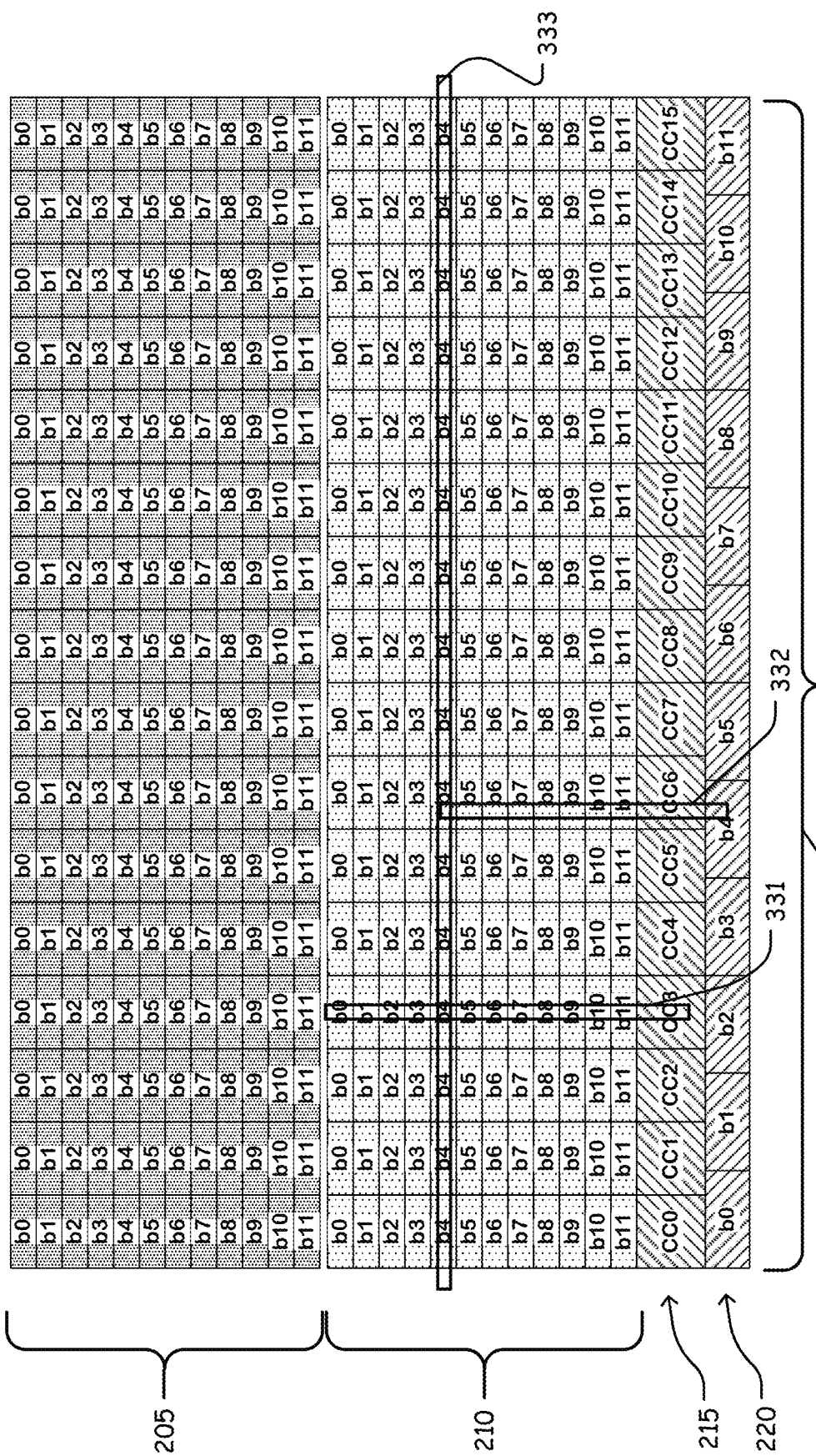
FIG. 3 illustrates the layout of FIG. 2, with interconnections for data transfer functions between cache columns in the cache unit array and local cache drivers in the cache unit array.

FIG. 3 illustrates the layout of the page buffer unit array 205 and cache unit array 210 as shown in FIG. 2, where like elements have the same reference numerals. In FIG. 3, the overlying interconnections formed in patterned conductor layers include for example corresponding to the cell b4, vertical interconnection 331, vertical interconnection 332, and horizontal interconnection 333. In an operation for transfer of data between the cache unit array 210, and the cache drivers in row 220, vertical interconnection 331 is energized by a control signal for connection of a cell in the selected row b4 to the horizontal interconnection 333. The horizontal interconnection 333 is connected by vertical interconnections 332 to the corresponding cache driver for b4. Twelve horizontal connections 333 (one for each row in the cache) can be operated in parallel, thereby translating the 12 bits a selected one of the 16 columns to the corresponding cache driver for communication with the interface circuit.

The technology described herein provides a data path in which the storage units accessed by binary addressing are distributed in transfer storage units having size that is a non-integer multiple of the binary addressable storage unit size, among the plurality of groups of cells in the memory array. In this manner, adjacent columns in a single unit array of the page buffer and the cache hold data bits from data that is not adjacent in the external addressing scheme. According to the data path described herein, a storage unit, such as a byte or a word, of the array addressed by a binary address of the external addressing scheme, that is not aligned with the transfer storage unit, is distributed via different groups of data lines to different groups of cells in the memory array.

Figure 4:
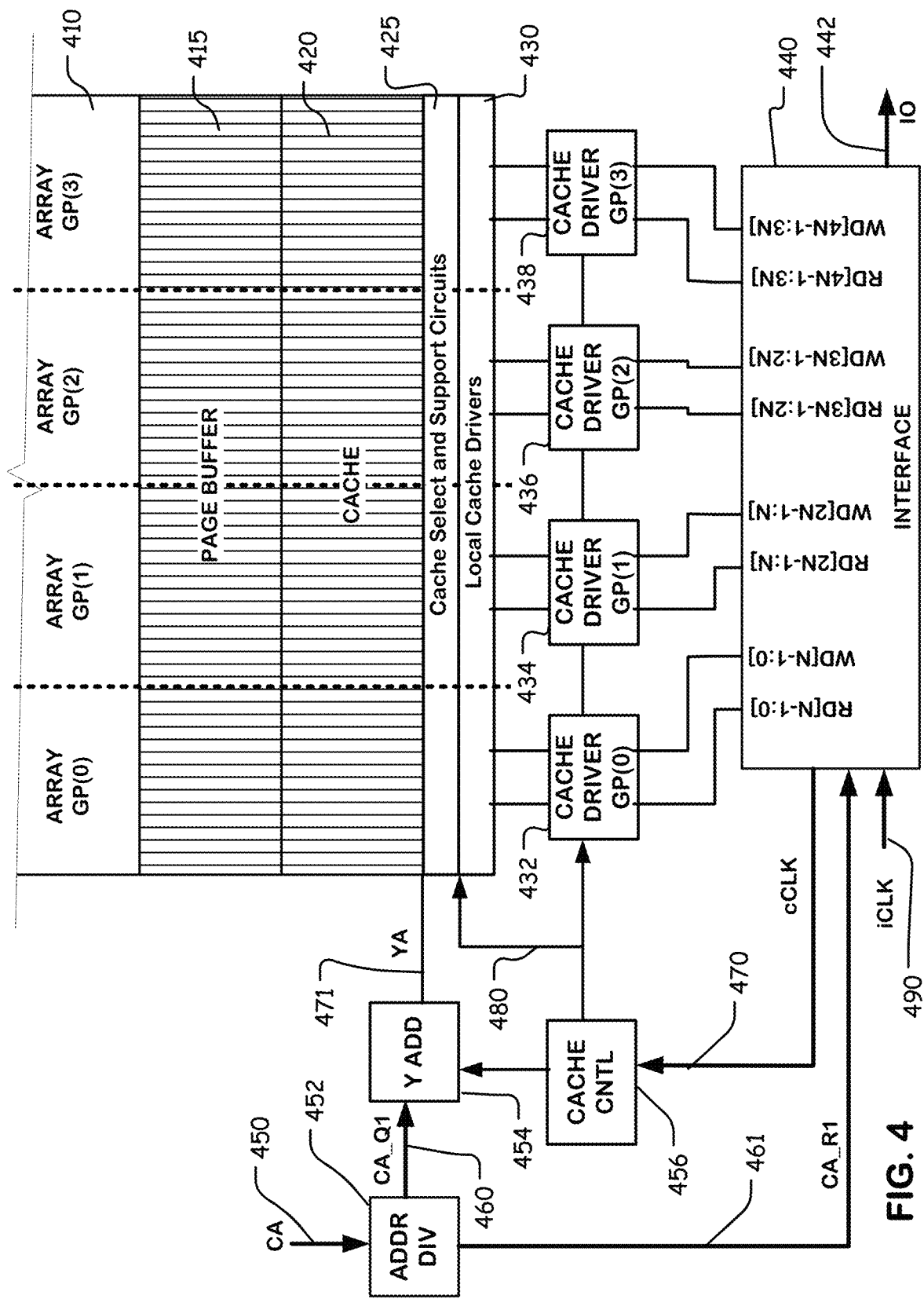
FIG. 4 is an alternate block diagram of a memory having a non-binary cache configuration.

FIG. 4 illustrates additional features of a system having a data path configuration as described herein. In FIG. 4, the array 410 is configured into a plurality of groups GP(0) to GP(3). The data path includes a page buffer 415 and a cache 420 configured into a plurality of unit arrays (represented by the vertical lines). Each group GP(0) to GP(3) in the array is served by a corresponding set of unit arrays of the page buffer 415 and cache 420.

The page buffer 415 includes X groups of page buffer unit arrays corresponding to the X groups of data lines. Each page buffer unit array is configured for access to an integer number P data lines in the plurality of data lines, and includes at least, the number P page buffer cells arranged in an integer number N rows and Y (Y=P/N) columns. Also, the page buffer 415 includes circuits for data transfer between the P page buffer cells to P cache cells in a corresponding cache unit array in the cache.

The cache 420 is coupled to the page buffer, and includes X groups of cache unit arrays corresponding to the X groups of page buffer units arrays (one group of cache unit arrays for each group of the X groups of data lines). Each cache unit array is configured for access to the integer number P buffer cells in the page buffer, and including the number P cache cells arranged in an integer number N cache rows and Y (Y=P/N) cache columns, where the number N is not a power of 2. Each cache unit array includes a local cache driver for accessing N cache cells in a selected one of the Y cache columns in the unit array.

Data path circuits are coupled to the cache, for connecting in each of the X groups of cache unit arrays, N cache cells in a selected one of the P/N cache columns in a selected cache unit array to M interface lines, where M is N times X. The M interface lines are coupled to an interface including circuits for data transfers in an integer number of D bit units, where D is a power of 2, and M is a common multiple of D and N.

The data path circuits illustrated in FIG. 4, include cache select and support circuits 425, and local cache drivers 430 for the purposes of controlling transfer of data between the page buffer 415 and the cache 420 within each unit array, and transfer of data from the cache 420 through the local cache drivers 430. Also, the data path circuits include group cache drivers 432, 434, 436, 438 for corresponding groups GP(0) to GP(3) of the array. In this example, the local cache drivers 430 are coupled to the group cache drivers 432, 434, 436, 438 for corresponding groups GP(0) to GP(3) of the array, by a N-bit read data path for transfers out of the cache, and a N-bit write data path for transfers into the cache. The group cache drivers 432, 434, 436, 438 are connected to a N-bit read data path for transfers to the interface circuits 440 in a read operation, and a N-bit write data path for transfers from the interface ports 442 to the cache in a write operation. The interface circuits 440 include circuits for transferring read data RD[N−1:0] from group cache driver 432, read data RD[2N−1:N] from group cache driver 434, read data RD[3N−1:2N] from group cache driver 436, and read data RD[4N−1:3N] from group cache driver 438. The interface circuits 440 also receive an interface clock iCLK on line 490. A multiplexer circuit inside the interface circuits 440 can connect external input/output interface ports 442 to corresponding portions of a consolidated read data path RD[4N−1:0]. Also, the interface circuits 440 include circuits for transferring write data WD[N−1:0] to group cache driver 432, write data WD[2N−1:N] to group cache driver 434, write data WD[3N−1:2N] to group cache driver 436, and write data WD[4N−1:3N] to group cache driver 438. A multiplexer circuit inside the interface circuits 440 can connect external interface ports 442 to corresponding portions of a consolidated read data path for RD[4N−1:0] and consolidated write data path WR[4N−1:0].

In the unit array, the location for the cache selection and support circuits 425 need not be between cache 420 and local cache drivers 430. The circuit can be distributed in the cache and page buffer array as suits a particular implementation.

In a read or write operation, a starting address is provided which identifies the first minimum addressable unit to be accessed for the operation. The read or write operation sequences through all of the minimum addressable units in an entire page to support a page read or write.

To support the non-binary addressing in the page buffer and cache unit arrays, addressing circuitry is provided. As illustrated in FIG. 4, in one example, column address CA is provided on line 450 in support of a memory operation using the external binary addressing system. The column address CA on line 450 is applied to an address divider 452. A factor F used as a divisor in the address divider 452 is derived as discussed above by dividing the width M=4N of the outputs of the selected unit arrays in each of the four groups, by the size of the minimum addressable unit. In examples described herein M=48 and the size of the minimum addressable unit is eight bits. The factor F in this example is 48/8=6. The factor F is not a power of 2, and in this example the divisor is a non-integer multiple of the size of the minimum addressable unit.

The address divider 452 outputs a column address quotient CA_Q1 on line 460 and a column address remainder CA_R1 on line 461. The column address quotient CA_Q1 is applied to a Y address generator 454 which outputs Y address signals on line 471 to the cache select and support circuits 425 and to the local cache drivers 430. Also, the Y address generator 454 exchanges control signals with a cache control block 456. A cache clock cCLK can be generated by dividing the interface clock iCLK at the interface block, or using other clock circuits or sources, and provided on line 470 to the cache control block 456. The cache clock cCLK and other control signals can be provided on line 480 to coordinate operation of the local cache drivers 430 and the group cache drivers 432, 434, 436, 438 for groups GP(0) to GP(3).

One selected column in one selected unit array in each of the four groups is output in each cache clock cycle. The outputs of the four groups form a cache addressed unit of a number M bits, where M is a common multiple of the maximum storage unit size DMAX output on a single cycle of the interface clock iCLK (for DDR with an 8 port output, DMAX is 16), and the number N which is the number of bits output by a unit array (N is 12 in these examples) in each group. In this example, a common multiple of 16 and 12 is 48, and M is equal to 48. There are four groups of data lines, because M/N equal 4. There are three 16-bit words in the cache addressed unit, because M/16 is 3.

In order to transfer a page, the Y address generator 454 produces a signal to select a starting unit array in each of the groups of unit arrays, and to transfer one cache column from the starting unit array in each of the four groups through the interface, and then cycles through all the unit arrays in the four groups to output an entire page in a sequence of cache addressed units of M bits. One of the starting unit arrays in the four groups stores the first bit of the minimum addressable unit identified by the column address CA, in a configuration supporting random start addresses for reads or writes within a page. One set of M bits is transferred to the interface circuits 440 in each cache clock cycle. The interface uses the remainder signal CA_R1 to generate control signals for the multiplexers to select the minimum addressable unit identified by the external address from the M bits in the data path, and to supply the selected minimum addressable unit to the interface for transfer on the interface ports 442. As mentioned above, in a double data rate implementation, two minimum addressable units can be transferred in interface clock cycle.

This data path requires circuits to translate the binary addressing used externally to access the minimum addressable unit, into the "non-binary" addressing of the page buffer and cache to access the cache columns holding a non-integer multiple of the number of bits in the minimum addressable unit. Likewise, the data path requires circuits to translate the non-binary addressing of the page buffer and the cache into the binary addressing of the input/output interface. One approach to controlling this addressing scheme involves including an address divider, where the binary address of the interface and the memory array is divided by a factor F that is a function of size M of the cache addressed unit (e.g. four transfer storage units of N bits each), and of the size of the minimum addressable unit of the binary addressing scheme used for the array. As described above, if the least significant bit of the binary addressing scheme corresponds to a byte (8 bits) and is the smallest storage unit externally addressable via the I/O interface, the factor F is M/8, which for the illustrated example is 48/8=6. If the least significant bit of the binary addressing scheme corresponds a word (16 bits), the factor F according to this formulation, would be M/16 (48/16=3).

Examples described above used a cache column size of 12 and a number of groups equal to four. These are advantageous examples but non-limiting. Other sizes can be utilized so long as the cache column size is a non-integer multiple of the size of the minimum addressable unit, or a non-integer multiple of the maximum data size output in one interface clock cycle.

Figure 5:
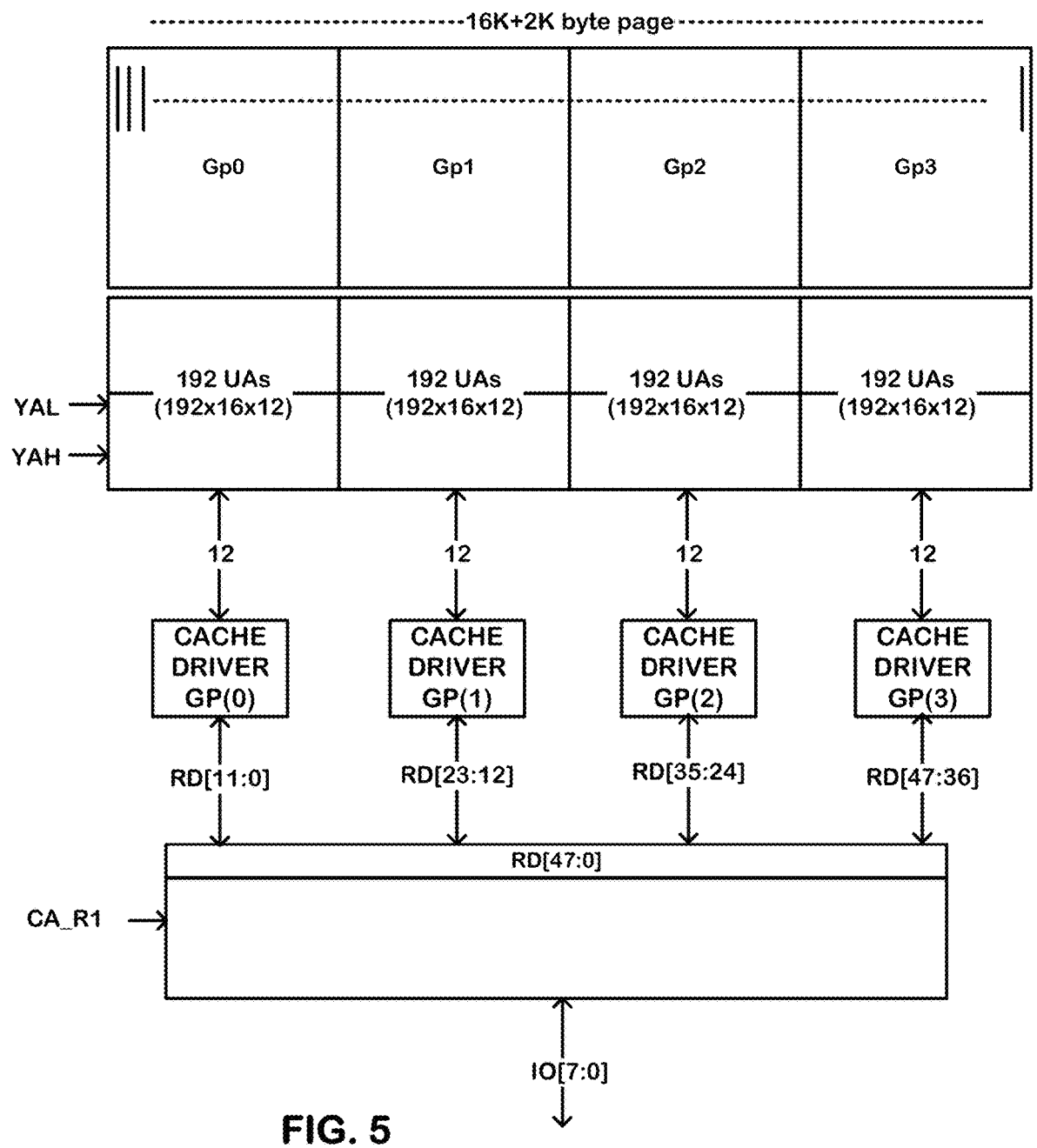
FIG. 5 is a block diagram of a memory like that of FIG. 1, illustrating an example configuration.

FIG. 5 illustrates a read data path configuration for a page size of 16K byte page data lines with 2K extra data lines, a size of the minimum addressable unit of eight bits, a cache column size of 12 bits, and a unit array size of 12×16 with 16 columns. The write data path is similar, and omitted for clarity of the drawing.

Page size (PS): 16 KB+2 KB
RD bus size: 48 bits=6 bytes=3 words
Number Of Groups (NOG): 4
Unit Array Size (UAS): 16 columns×12 bits
Number Of Unit Arrays in each group (NOUA)
PS≤UAS×NOUA×NOG
NOUA≥PS/(UAS×NOG)=(18×1024×8)/(16×12×4)=192.

Thus, for this configuration, there are 192 unit arrays in each group; and there are 768 unit arrays in the page buffer/cache serving the memory array. Each group of data lines includes 192×12×16 data lines. To transfer one page, four groups of unit arrays operate in parallel, and the 192 unit arrays in each group are accessed in sequence. In the sequence, the selected unit array (responsive to YAH signal) can output a selected cache column (responsive to YAL signal) of 12 bits each cache clock cycle, which is combined with the outputs of the four groups to form an M bit cache addressed unit. This is executed for sixteen YAL cycles to output all the columns in the selected cache unit array, and then the next YAH cycle is executed, moving to the next cache unit array in the sequence until all 192 unit arrays in all the groups are accessed.

Other configurations can be used. One generalization for the configurations supporting the techniques described herein can be as follows:

A 2i×N unit array is proposed (16×12 unit array is shown above for i=4 & N=12 case). N can be any non-integer multiple of the size of the minimum addressable unit.

In one CACHE_CLK, only N bits data are read/written for the selected unit array of each group.

In one CACHE_CLK, M bits data are read/written from the cache, M is the common multiple of N and DMAX, where DMAX is the maximum number of bits transferred in one interface clock cycle (DMAX=16 for DDR in the example above). M is not a power of 2. (M=48 for the example above)

YADD counter (YA) is added by 1 to select a next column, for every M/2i outputs of a cache column of N bits. An address divider is added to translate the external binary address to the YADD system for the page buffer and cache, and for the interface circuits.

Sequentially addressed bytes, or other minimum addressable units, for the external addressing system are scattered among the groups of the array in a write operation in cache column units of N bits, so that the number M of bits written to the groups in the array and transferred in each cache clock cycle consists of an integer number of sequential minimum addressable units for the interface. Also, sequentially addressed minimum addressable units for the external addressing system are gathered from the groups of the array in a read operation in cache column units of N bits, so that the number M of bits read from the groups in the array and transferred in each cache clock cycle consists of an integer number of sequential minimum addressable units for the interface.

Figure 6:
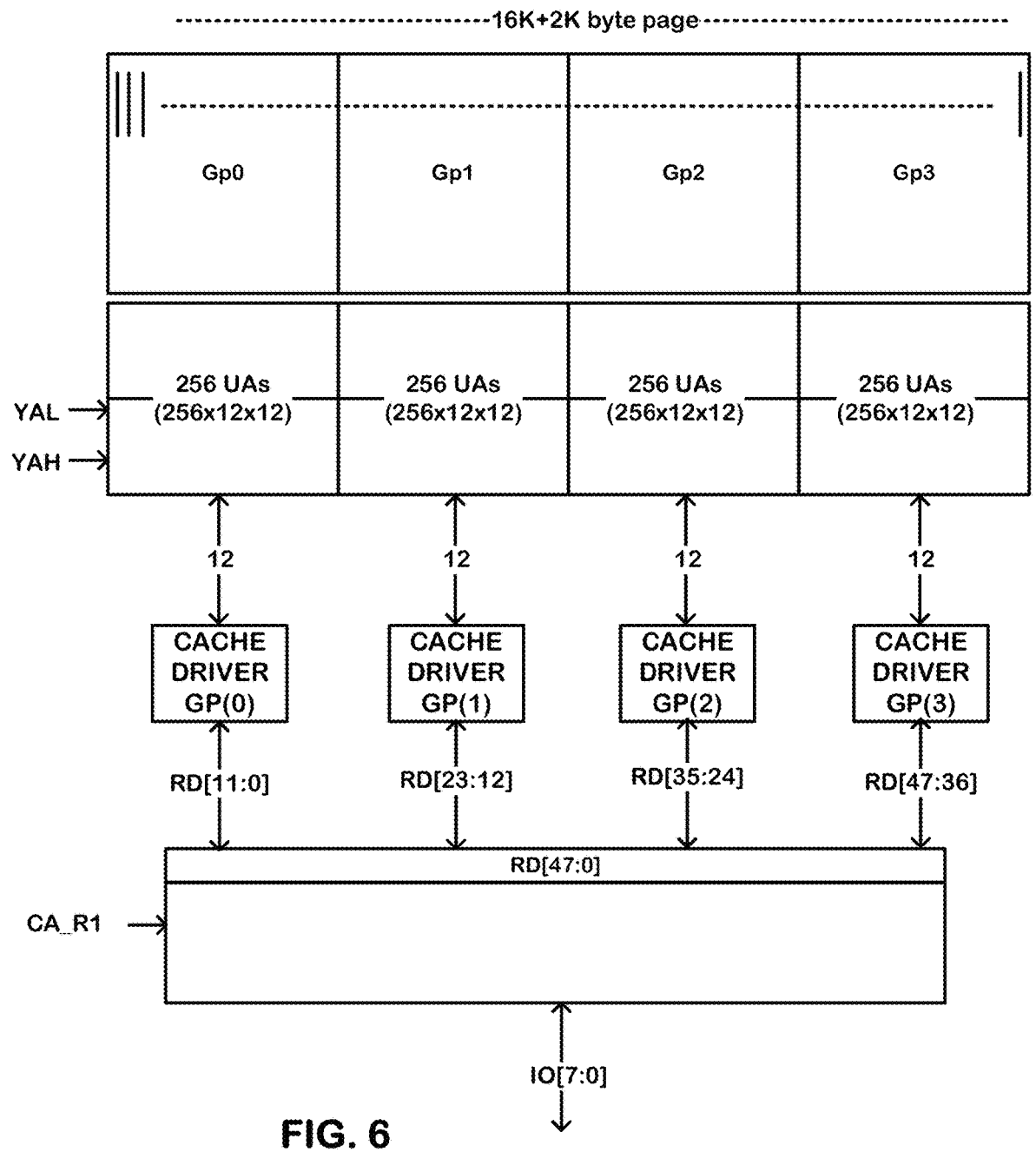
FIG. 6 is a block diagram of a memory like that of FIG. 1, illustrating another example configuration.

FIG. 6 illustrates another example configuration for a page size of 16K byte page data lines with 2K extra data lines, a size of the minimum addressable unit of eight bits, a cache column size of 12 bits, and a unit array size of 12×12 with 12 columns. Here, the number of cache columns equals the number of rows, and is also therefore a non-integer multiple of the size of the minimum addressable unit.

Page size (PS): 16 KB+2 KB
RD bus size: 48 bits=6 bytes=3 words
Number Of Groups (NOG): 4
Unit Array Size (UAS): 12 columns×12 bits
Number Of Unit Array in each group (NOUA)
PS≤UAS×NOUA×NOG
NOUA≥PS/(UAS×NOG)=(18×1024×8)/(12×12×4)=256

Thus, for this configuration, there are 256 unit arrays in each group, and there are 1024 unit arrays in the page buffer/cache serving the memory array. To transfer one page, four groups of unit arrays operate in parallel, and the 256 unit arrays are accessed in sequence. In the sequence, the selected unit array can output a selected column of 12 bits each cache clock cycle, which is combined with the output of the four groups. This is executed for twelve cycles, and then the next unit array in the sequence is accessed until all 256 unit arrays in all the groups are accessed. In this example, the unit array is not configured according to the generalization, 2i×N, because the number of cache columns in each unit array is not a power of 2.

In the N×N configuration of FIG. 6, the Y address generator addresses the complexity of determining when to jump to the next unit array on 12 cycle boundaries in the generation of the YAL signal and YAH signal, rather than on boundaries that align with a power of 2, such as 16.

The configurations can vary based on the parameters describe herein, including page size (16K, 32K etc.), cache column size N, minimum addressable unit size (byte, word), and maximum data transfer per interface clock (DMAX, e.g. two bytes in a DDR mode). The cache column size N can be selected according to the physical layout choices for a particular implementation. The examples above use a cache column size N equal to 12. The cache column size N can be other non-integer multiples of the size of the minimum addressable unit.

For example, N can be an odd number such as 9, although this may result is a remainder number of data lines for a page size not divisible by 9 bits. M in this case, assuming a DMAX of 8, is a common multiple of 9 and 8, which can be 72. In this case, there would be 72/9=8 groups of unit arrays.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A memory addressable using an addressing scheme with a byte-sized minimum addressable unit, comprising:
   a memory array;
   a data interface; and
   a data path configured for transferring data between the memory array and the data interface in transfer storage units, each transfer storage unit, of the transfer storage units, having N bits, where N is an integer equal to a multiplication of a non-integer and a size of the minimum addressable unit in bits.

2. The memory of claim 1, wherein the data path includes a page buffer configured for connection to the memory array, and a cache configured for connection to the page buffer and the data interface, and wherein:
   the memory array includes a plurality of data lines for connection to the page buffer, arranged in a number X of groups of data lines; and
   the cache includes one group of cache unit arrays for each group of the X groups of data lines, each cache unit array configured for access to an integer number P bits in the page buffer, and including the number P cache cells arranged in N cache rows and P/N cache columns.

3. The memory of claim 2,
   wherein the data path includes circuits coupled to the cache, for connecting N cache cells in a selected one of the P/N cache columns in a selected cache unit array in each of the X groups of cache unit arrays to M interface lines, where M is N times X, and
   wherein the data interface is coupled to the M interface lines, and includes circuits for data transfers in D bit units, where D is an integer multiple of the size of a minimum addressable unit, and M is a common multiple of D and N.

4. The memory of claim 3, including:
   address translation circuits, responsive to an input address to generate select signals for the circuits in the data path.

5. The memory of claim 1, wherein:
   the memory array includes a plurality of data lines for connection to a page buffer, arranged in a number X of groups of data lines; and
   a page of data according to the addressing scheme includes a plurality of minimum addressable units with sequential addresses, and a page of data stored in the memory array is scattered in storage units of N bits among memory cells coupled to data lines disposed non-sequentially across the X groups.

6. The memory of claim 1, wherein N is not a power of 2.

7. A memory, comprising:
a memory array including a plurality of data lines for access to memory cells in the memory array using an addressing scheme with a minimum addressable unit having a size, the plurality of data lines including a number X groups of data lines, where X is an integer greater than 1;
a page buffer configured for access to the plurality of data lines, the page buffer including a page buffer cell for each data line in the plurality of data lines;
a cache coupled to the page buffer, the cache including one group of cache unit arrays for each group of the X groups of data lines, each cache unit array configured for access to an integer number P buffer cells in the page buffer, and including the number P cache cells arranged in an integer N cache rows and P/N cache columns, where N is a non-integer multiple of the size of the minimum addressable unit;
data path circuits coupled to the cache, for connecting N cache cells in a selected one of the P/N cache columns in a selected cache unit array in each of the X groups of cache unit arrays to M interface lines, where M is N times X;
an interface coupled to the M interface lines, including circuits for data transfers in D bit units, where D is an integer multiple of the size of the minimum addressable unit, and M is a common multiple of D and N; and
address translation circuits, responsive to an input address to generate select signals for the data path circuits.

8. The memory of claim 7, wherein the address translation circuits include an address divider, to divide the input address by a factor equal to the number M divided by a size of the minimum addressable unit to generate the select signals.

9. The memory of claim 8, wherein the address divider generates a quotient and a remainder, and the address translation circuits include a cache address generator to select cache columns and cache unit arrays, and the interface includes circuits to generate a select signal to a connect a selected D bit unit in the M interface lines for transfer.

10. The memory of claim 7, wherein the page buffer includes X groups of page buffer unit arrays for corresponding ones of the X groups of data lines, each page buffer unit array configured for access to an integer number P data lines in the plurality of data lines, and including the number P page buffer cells arranged in an integer number N rows and P/N columns, and including circuits for data transfer between the P page buffer cells to P cache cells in a corresponding cache unit array in the cache.

11. The memory of claim 7,
wherein the plurality of data lines have an orthogonal pitch, and
wherein each cache column in the cache unit arrays in the cache fits within the orthogonal pitch of the number N data lines in the plurality of data lines.

12. The memory of claim 7, wherein the number P/N is an integer multiple of the size of the minimum addressable unit.

13. The memory of claim 7, wherein the number P/N is a non-integer multiple of the size of the minimum addressable unit.

14. The memory of claim 7, wherein the address translation circuits generate a sequence of select signals for the data path circuits and the interface, for transfer of a plurality of D bit units having sequential addresses on the interface.

15. The memory of claim 7, wherein the plurality of data lines are coupled to a page of memory cells in the memory array, the address translation circuits generate a sequence of select signals for the data path circuits and the interface, for transfer of a page of data in D bit units having sequential addresses on the interface.

16. The memory of claim 7, wherein the data path circuits include a number X of group drivers coupled to the cache, each group driver coupled to one of the groups of cache unit arrays.

17. The memory of claim 7, wherein N is not a power of 2.

18. The memory of claim 7, where D is 16 and N is 12.

19. The memory of claim 7, wherein the D is two times the size of the minimum addressable unit.

20. The memory of claim 7, wherein the D is equal to the size of the minimum addressable unit.

* * * * *